United States Patent [19]

Shanklin

[11] 4,362,036

[45] Dec. 7, 1982

[54] FUEL TANK LOCKING APPARATUS

[75] Inventor: Donald J. Shanklin, Fullerton, Calif.

[73] Assignee: Superior Industries International, Inc., Van Nuys, Calif.

[21] Appl. No.: 106,396

[22] Filed: Dec. 26, 1979

[51] Int. Cl.³ .................. B65D 51/18; B65D 55/14
[52] U.S. Cl. .................................. 70/167; 70/168; 70/169; 70/14; 220/86 R; 220/86 AT; 220/210; 220/256; 220/287; 292/DIG. 38
[58] Field of Search ............... 70/63, 165, 371, 14, 70/169, 173, 167, 168, 166, 163, 171, 424, 428, 231, 370, 232, 258; 220/86 AT, 210, 326, 256, 287, 324; 292/224, DIG. 38, 19, 49, 52, 83, 85, 87, 226, 228; 141/346, 348

[56] References Cited

U.S. PATENT DOCUMENTS

| | | | |
|---|---|---|---|
| 1,195,909 | 8/1916 | Cochrane | 292/49 |
| 1,212,878 | 1/1917 | Augenbraun | 70/168 X |
| 1,369,123 | 2/1921 | Nutry | 70/169 X |
| 1,477,043 | 12/1923 | Drake | 220/323 |
| 1,713,602 | 5/1929 | Heiden | 70/428 |
| 1,725,908 | 8/1929 | Gerneth et al. | 70/168 |
| 1,738,069 | 12/1929 | Holtson | 220/86 AT |
| 1,977,493 | 10/1934 | Scott | 70/169 X |
| 1,995,997 | 3/1935 | Morris | 220/86 AT |
| 2,061,638 | 11/1936 | Segal | 70/165 X |
| 2,073,109 | 3/1937 | Kirkwood | 70/371 X |
| 2,380,217 | 7/1945 | Chapman et al. | 70/167 |
| 2,677,261 | 5/1954 | Jacobi | 70/14 |
| 2,696,100 | 12/1954 | Nehls | 70/169 X |
| 3,126,728 | 3/1964 | Nehls | 70/169 |
| 3,402,580 | 9/1968 | Speck | 70/169 |
| 3,813,904 | 6/1974 | Wallskog | 70/169 |
| 3,902,340 | 9/1975 | Leyden | 70/57 |
| 3,954,201 | 5/1976 | Ostrowsky et al. | 220/326 X |
| 3,998,353 | 12/1976 | Farelli | 70/167 X |
| 4,135,562 | 1/1979 | Martineau et al. | 220/86 R X |
| 4,185,844 | 1/1980 | Hubbard et al. | 141/348 X |

FOREIGN PATENT DOCUMENTS

| | | | |
|---|---|---|---|
| 135617 | 11/1933 | Austria | 292/224 |
| 1238782 | 4/1967 | Fed. Rep. of Germany | 70/371 |
| 2224929 | 12/1972 | Fed. Rep. of Germany | 292/DIG. 38 |
| 701303 | 1/1931 | France | 292/228 |

Primary Examiner—Ramon S. Britts
Assistant Examiner—Carl F. Pietruszka
Attorney, Agent, or Firm—Fulwider, Patton, Rieber, Lee & Utecht

[57] ABSTRACT

A fuel tank lock for use with a conventional filler neck of an automotive vehicle. The filler neck has a baffle plate formed with a constricted passage normally closed by a biased-shut valve carried by the baffle plate. The valve is forced open when engaged by an unleaded fuel nozzle. The upper end of the filler neck is provided with a conventional fuel tank cap. The fuel tank lock includes a body provided with a key operated lock and a shank that extends through the constricted passage. The lock operates a latch that engages the underside of the baffle plate to prevent unauthorized withdrawal of the lock from the filler neck.

9 Claims, 26 Drawing Figures

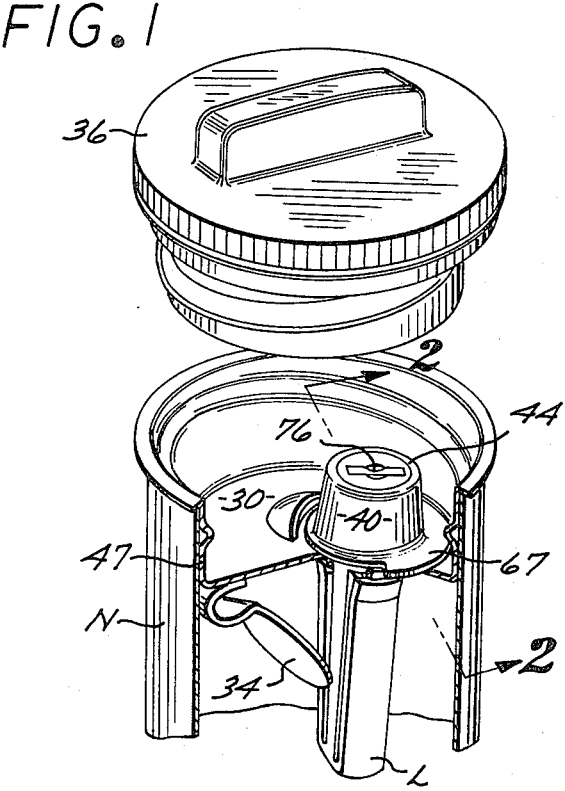
FIG. 1
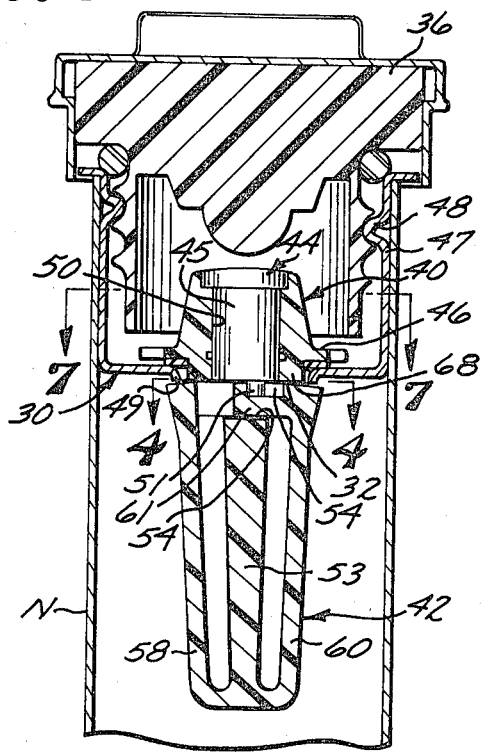
FIG. 2
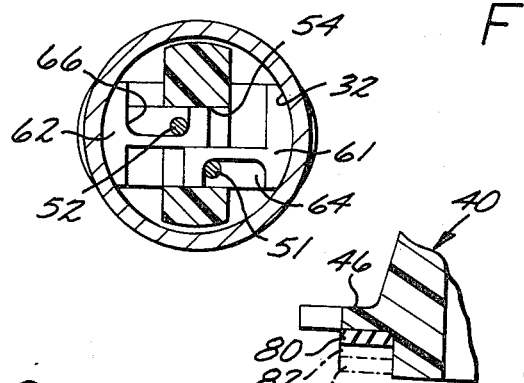
FIG. 4
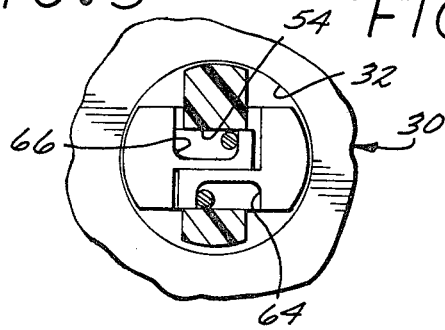
FIG. 5
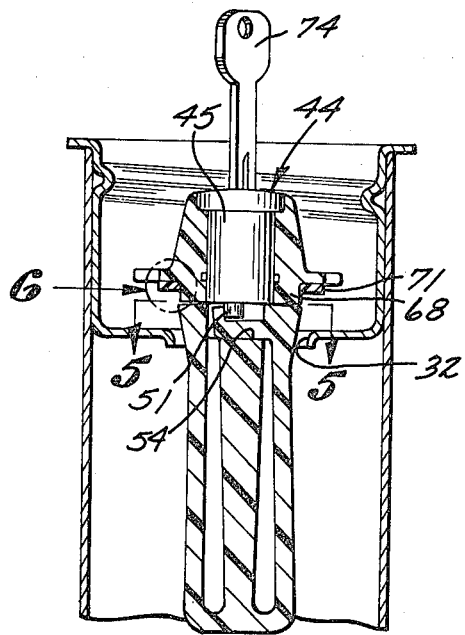
FIG. 3
FIG. 6

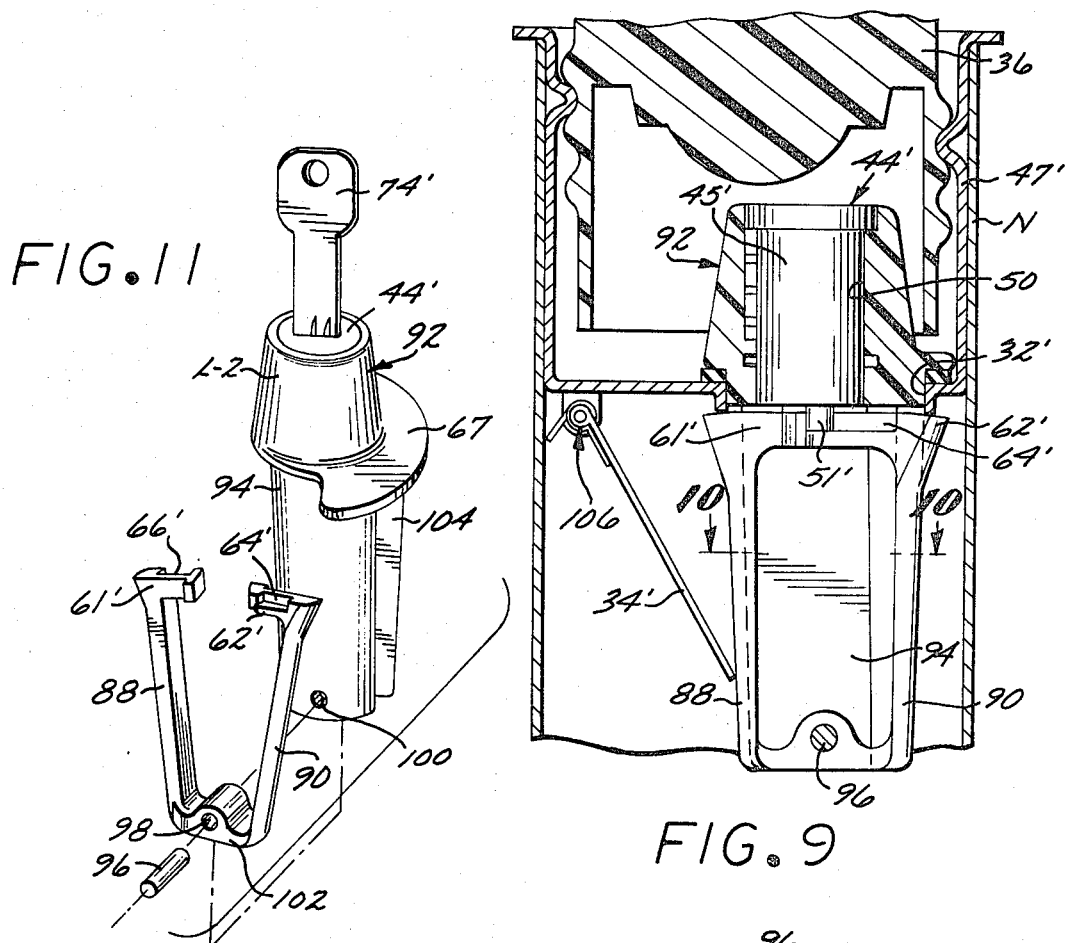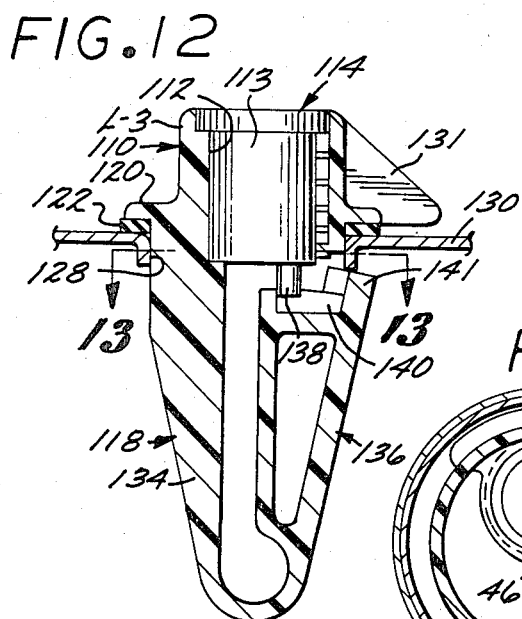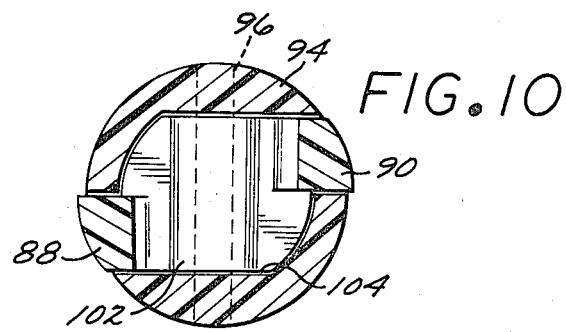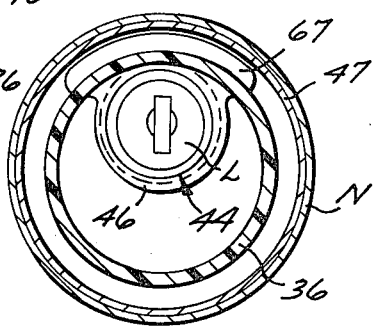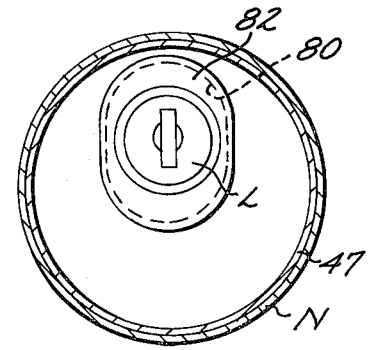

FUEL TANK LOCKING APPARATUS

BACKGROUND OF THE INVENTION

The present invention relates generally to automotive vehicles, and more particularly to a fuel tank lock for use with a fuel system operating with unleaded fuel.

In recent years pollution control laws have required the provision of automotive vehicle fuel systems, operating solely with unleaded fuel. To this end, such fuel systems have included a filler neck which inhibits filling of a fuel tank with leaded fuel delivered from a large diameter nozzle, but permits filling of the fuel tank with unleaded fuel delivered from a smaller diameter nozzle. The filler neck is provided with a baffle plate having a constricted passage, normally closed by a biased-shut valve carried by the baffle plate, with such valve being forced open when engaged by an unleaded fuel nozzle of smaller diameter than the constricted passage. The upper end of the filler neck is provided with a conventional original equipment cap. Such original equipment filler neck caps are generally of the non-locking type. These original equipment caps must meet rigid safety and emissions specifications in order to be approved. Accordingly, it is undesirable that such original equipment non-locking caps be replaced by non-approved locking caps. Replacement of original caps also involves cost consideration.

BRIEF DESCRIPTION OF THE INVENTION

The fuel tank lock of the present invention permits the filler neck of an unleaded fuel system to be secured against unauthorized access without replacement of the original equipment filler neck cap. Accordingly, such fuel tank lock does not interfere with the proper operation or safety of the original equipment cap, and yet effectively prevents insertion of a siphon hose or the like into the fuel tank. Such lock moreover discourages the introduction of foreign matter into the fuel tank. The cost of a fuel tank lock of the present invention is less than the cost of a replacement locking gas cap.

The fuel tank lock of the present invention may be utilized with approximately ninety (90%) percent of the automotive vehicles sold in the United States since 1975, and approximately thirty (30%) percent of all automotive vehicles presently foreseeable. To this end, the lock may be provided with an adapter to conform to the configuration of either a circular or a non-circular constricted passage. Also, such lock is provided with washer means capable of meeting manufacturing tolerances of the various constricted passages utilized by different manufacturers.

Said fuel tank lock includes a body provided with a key-operated locking mechanism in its portion and a shank that extends through the constricted passage. In one embodiment of the invention a shoulder is formed on the upper portion of the body to rest upon the upper surface of the baffle plate and support the body upon the baffle plate. Where the constricted passage is circular and eccentric to the filler neck a transverse constricted passage to prevent rotation of the body relative to the filler neck. In each embodiment latch means connected with the locking mechanism are operatively associated with the body shank moveable between a locked position wherein part of the latch means extends transversely of the underside of the baffle plate to prevent withdrawal of the shank from the constricted passage. In its unlocked position, the latch means are disposed within the confines of the constrictor passage to permit withdrawal of the shank from the passage. The latch means is actuated by the locking mechanism. The gas tank lock may be inserted into its locked position without requiring a key, with the key being utilized solely to unoock and remove the gas tank lock.

These and other objects and advantages of the present invention will become apparent from the following detailed description when taken in conjunction with the accompanying drawings.

BRIEF DESCRIPTION OF THE DRAWINGS

FIG. 1 is a broken sectional view showing a preferred form of fuel tank lock embodying the present invention arranged in a locked position within a filler neck, with the conventional cap received by such filler neck being shown disposed thereabove;

FIG. 2 is a vertical sectional view taken along line 2—2 of FIG. 1, but with the cap being shown in its installed position covering the upper end of the filler neck;

FIG. 3 is a vertical sectional view similar to FIG. 2, but showing the cap removed and the parts of the gas tank lock arranged in their unlocked position;

FIG. 4 is a horizontal sectional view taken along line 4—4 of FIG. 2;

FIG. 5 is a horizontal sectional view taken along line 5—5 of FIG. 3;

FIG. 6 is an enlarged view of the encircled area designated 6 in FIG. 3;

FIG. 7 is a horizontal sectional view along 7—7 of FIG. 2;

FIG. 8 is a view similar to FIG. 7, but showing the gas tank lock as utilized with an an oval-shaped constricted passage;

FIG. 9 is a vertical sectional view of second form of gas tank lock embodying the present invention;

FIG. 10 is a horizontal sectional view taken along line 10—10 of FIG. 9;

FIG. 11 is a horizontal exploded view of the fuel tank lock of FIGS. 9 and 10;

FIG. 12 is a vertical sectional view of a third form of fuel tank lock embodying the present invention;

DESCRIPTION OF PREFERRED EMBODIMENTS

Figure 13:
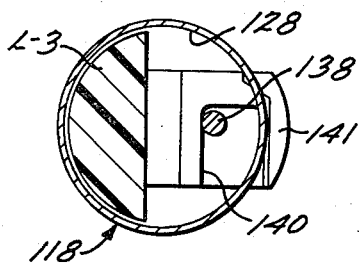
FIG. 13 is a horizontal sectional view taken along line 13—13 of FIG. 12.
Figure 14:
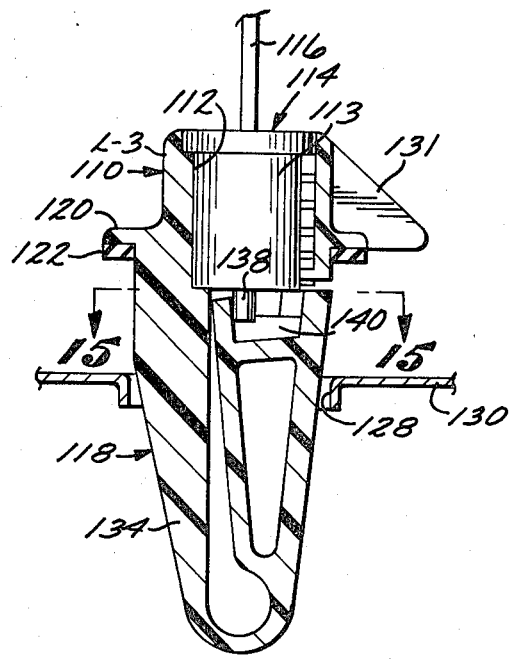
FIG. 14 is a vertical section view similar to FIG. 12, but showing the parts of the gas tank lock in their unlocked position.

Referring to the drawings and particularly FIGS. 1-6, thereof, there is a shown a preferred form of fuel tank lock L for use with the conventional filler neck N of an automotive vehicle. The filler neck is provided with a transverse baffle plate, generally designated 30, wherein is formed a constricted passage 32 that is eccentric to filler neck N and is normally closed by a spring loaded biased-shut valve 34. A screw-thread cap 36 is adapted to close the upper end of the filler neck N. The construction of filler neck N and its baffle plate 32 and its valve 34, and cap 36 should be understood as being conventional. It should also be understood that the connection between the filler neck N and cap 36 could be of the bayonet type. It should further be understood that valve 34 is adapted to be forced open when engaged by an unloaded fuel nozzle (not shown). The constricted passage 32 has a diameter which permits the entry of an unleaded fuel nozzle, but is sufficiently small as to prohibit entry of a large fuel nozzle of the type employed to dispense leaded fuel.

Fuel tank lock L includes a body, generally designated 40, which is of general frusto-conical configuration, and a shank, generally designated 42 that is extended through constricted passage 32. The body 40 houses a conventional key-operated locking mechanism 44 and a collar 46 of larger dimensions than the constrictor passage so as to prevent the body from entering the constricted passage.

More particularly, with continued reference to FIGS. 1-6 filler neck N has affixed to its upper end a cup 47 formed with a screw thread 48 to receive cap 36 and at its lower end with the constricted passage 32. The confines of passage 32 are defined by a downwardly curved lip 49. The first form of lock K embodying the present invention is of one-piece construction. The body 40 and shank 42 are preferably integrally formed of a suitable resilient synthetic plastic, having a memory, such as an acetal copolymer or a polymer plastic. Shank 42 is rigid relative to the body. Body 40 is seen formed with a central cavity 50 that rotatably receives the cylinder 43 of a conventional key-operated locking mechanism 44. The locking mechanism 44 includes a pair of depending latch pins 51 and 52 that extend below and are affixed to lock cylinder 45. Shank 42 includes a central web 53 that depends from the underside of body 40, with the upper portion of such web 53 having a window 54. The lower end of web 53 is integral with a pair of upwardly extending latch arms 58 and 60 of like configuration. These latch arms are shown in FIG. 2 in their semi-relaxed, extended position, wherein their upper ends are extended transversely of the longitudinal axis of lock L. It should be understood that the resiliency of the plastic material from which the latch arms and shank are formed results in such arms being constantly yieldingly biased outwardly. The upper ends of latch arms 58 and 60 are integrally formed with inwardly extending latch fingers 61 and 62 which are respectively formed with pockets 64 and 66 which receive the aforementioned locking pins and 51 and 52.

It should be noted that body collar 46 is formed with an integral transverse extension 67 that engages the inside of filler neck cup 47, so as to prevent rotation of body 40 relative to the filler neck, as shown particularly in FIGS. 1 and 7. The lower part of body 40 below collar 46 is formed with a cylindrical boss 68 that telescopes into lip 49 of constricted passage 32. Boss 68 carries resilient washer 71.

In the operation of the aforedescribed form of fuel tank lock L, the locking mechanism 44 initially has its parts arranged in an unlocked position, as indicated in FIGS. 3 and 5. In this position the pins 51 and 52 are disposed within the pocket 64 and 66 of latch fingers 61 and 62, offset to one side of the longitudinal axis of lock body 40. As shown in FIGS. 2 and 4, with this interpositioning of the pins and the latch finger pockets, the latch arms 58 and 60 will be disposed in their semi-relaxed transversely extended positions, but with such latch arms being free to swing inwardly towards one another as shank 42 is forced downwardly through constricted passage 32 by engagement with the lip 49. When the upper ends of latch fingers 61 and 62 clear the underside of baffle plate lip 49, latch arms 58 and 60 will spring outward to their extended position so as to automatically secure the lock L onto baffle plate 30 without requiring use of key 74. Referring particularly to FIG. 4, the confines of constrictor passage 32 are designated by line 32, and it will be apparent that the upper ends of latch fingers 61 and 62 extend beyond such confines. It will also be noted that latch fingers 61 and 62 move axially within window 54 of web 53.

Referring now to FIGS. 3 and 5, in order to withdraw lock L from constricted passage 32, a key 74 is inserted into the lock mechanism 44 through a slot 76 formed in the upper portion of lock cylinder of such locking mechanism. As the key 74 is rotated, such key effects rotation of lock cylinder 45, back 40 is restraind against rotation engagement of extension 67 with the side of the filler neck cup 47 and latch pins 51 and 52 will rotate inwardly from their position of FIG. 4 to their position shown in FIG. 3 and FIG. 5, i.e. such pins will move axially across the longitudinal axis of body 40 thereby forcing the latch fingers and latch arms towards one another to a retracted position wherein the upper end of the latch fingers will be disposed within the confines of constrictor passage 32. The lock L may then be readily withdrawn upwardly through filler neck N by means of key 74. Constricted passage 32 will now be free to receive an unleaded gas nozzle. During such rotation of cylinder 44 and pins 51 and 52, body 40 is restrained against rotation by engagement of collar extension 67 with the side of filler neck cup 47. After refueling, shank 42 will be forced downwardly through the constricted passage until latch arms 58 and 60 again automatically spring outwardly into their extended locked position. As the latch arms spring outwardly they will cam latch pins 51 and 52 back to their original position of FIGS. 2 and 4 because of the engagement of the pins with pockets 64 and 66.

It should be understood that it is desirable for the fuel tank locks of the present invention to fit several types of unleaded fuel baffle plates. It should be further understood that curved lip 49 of such baffle plates may have different vertical dimensions for similar diameter constricted passages. It is therefore necessary that provision be made to accomodate such varying vertical dimensions. As indicated in FIG. 6, such accomodation may be provided by the use of a plurality of resilient and/or nonresilient washers 80 below collar 46. In FIG. 6 one of such washers 80 is shown in solid outline, with an additional two of such washers 82 and 84 being shown in phantom outline. The utilization of one or more of such washers will permit accomodation of curved lips 49 of different vertical dimensions. As an alternative to the use of a plurality of such washers, a single washer (not shown) having the height of a plurality of such washers may be employed. Where a single washer is employed, its resiliency should generally be higher than where a plurality of such washers are utilized.

It should be further understood that key 74 may be provided with a shank that is of greater length than usual in order to facilitate insertion of such key within the upper portion of filler neck N. Alternatively, the shank of such key may be made extendable. It is an important feature of the present invention that a key need not be employed to secure the lock L in its locked position on baffle plate 30. Instead, the yieldingly biased resiliency of latch arms 58 and 60 make it possible to merely force the shank 42 downwardly through passage 32 whereafter the latch arms will automatically snap outwardly into a locked position.

Referring now to FIG. 8, the aforedescribed fuel tank lock L' is shown utilized with an oval-shaped constricted passage 80 shown in dotted outliner, rather than the circular constricted passage 32 shown in FIGS. 1-7. In order to accomodate this oval-shaped constricted passage 80, the lower portion of the body of such lock is formed with an oval-shaped boss 82 which complementarily fits within the oval-shaped constricted passage 80 to prevent rotation of the body therewithin. In all other respects, the lock of this figure is similar to the aforedescribed lock L, with the exception of the elimination of the transverse collar 67 of the aforesaid lock L. Such protrusion is not necessary in the modified lock L' because the constricted opening 80 is oval-shaped rather than circular, as in the case of constricted opening 32.

Referring now to FIGS. 9, 10 and 11, there is shown a second form of gas tank lock L-2 embodying the present invention. In general, lock L-2 is similar in construction to lock L, with the exception that the latch arms 88 and 90 are separate of the lock body, generally designated 92. Accordingly, like parts bear primed reference numerals. Body 92 is formed with a cylindrical cavity 50' that receives the cylinder 45' of locking mechanism 44'.

The lock arms 88 and 90 are secured to the lower end of a shank 94 of body 92 by means of a pin 96 extended through aligned bores 98 and 100 formed, respectively, in the lower center portion of a web 102 integrally connecting the lower ends of the latch arms and in body shank 94. Body shank 94 is of downwardly tapered frusto-conical configuration and includes a vertical slot 104 which receives latch arms 88 and 90, as indicated particularly in FIG. 10. It should be understood that latch arms 88 and 90, web 102 and latch fingers 61' and 62' are integrally molded from a suitable resilient synthetic plastic having a memory whereby the latch arms are constantly biased towards their transversely extended relaxed position of FIG. 11. As in the case of the latch arms 58 and 60, latch arms 88 and 90 extend upwardly and sidewardly, and in their relaxed position, their respective latch fingers 61' and 62' are disposed outwardly of the confines of constrictor passage 32'. These latch arms 88 and 90 are controlled by a pair of latch pins in the same manner described hereinbefore with respect to latch pins 51 and 52 of lock L. It should be noted that in the construction of FIGS. 9, 10, and 11, filler neck valve 34' is shown biased towards a closed position by means of a conventional torsion spring arrangement designated 106.

The operation of lock L-2 is similar to that of lock L, with lock arms 88 and 90 automatically snapping outwardly into a locked position when shank 94 is urged downwardly through constricted passage 32'. To remove lock L-2 from baffle plate 30', the key 74' is rotated to rotate the latch pins inwardly towards the longitudinal axis of body 92, whereby latch fingers 61' and 62' clear constricted passage 32'.

Referring now to FIGS. 12-15, there is shown a third form of fuel tank lock L-3 embodying the present invention. Fuel tank lock L-3 includes an integral one-piece body, generally designated 110, the upper portion of which is formed with a cylindrical cavity 112 that houses the cylinder 113 of a conventional locking mechanism 114 controlled by a key 116. The lower portion of body 110 defines a downwardly tapered shank, generally designated 118. Body 110 includes a collar 120, the underside of which abuts a resilient washer 122. Washer 122 encompasses a cylindrical boss 124 that is inserted within the downwardly curved lip 126 of a circular constricted passage 128 formed in baffle plate 130. Collar 120 may be provided with a transverse extension (not shown) similar to collar extension 67 of lock L to engage one side of the filler neck (not shown) and thereby prevent rotation of body 110 relative to such filler neck. Preferably, body 110 will also be formed with a triangular web 131, the underside of which is in the same horizontal plane as the underside of collar 120, to assist in stabilizing body 110 relative to baffle plate 130 when lock L-3 is locked relative to such plate.

Figure 15:
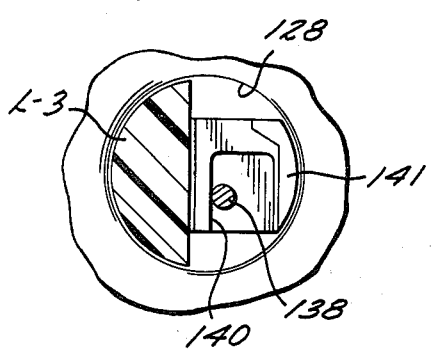
FIG. 15 is a horizontal sectional view taken along line 15—15 of FIG. 14.

Shank 118 includes a support arm 134 which rigidly depends from one side of body 110, and a latch arm 136 which extends upwardly from the lower end of support arm 134. The latch arm 136 is preferably formed of a suitable synthetic plastic material, in such a manner that in its relaxed position it will tend to spring outwardly relative to the constricted passage 128. Hence the upper end of such latch arm will extend to one side of constricted passage 128, so as to secure lock L-3 in place within such constricted passage when lock L-3 is in its unlocked condition. The locking mechanism 114 includes a single latch pin 138 that depends from lock cylinder 113 into a pocket 140 formed in the upper portion of a latch finger 141 formed on latch arm 136. Referring to FIGS. 13 and 15, it will be seen that latch pin 136 rotatably travels from an unlocked position disposed to one side of the longitudinal axis of locking mechanism 114 to a position disposed on the opposite side of such axis. Such movement of latch pin 138, controls the sidewards swinging movement of latch arm 136 between a position wherein the upper end of latch finger 141 extends beyond the confines a constricted passage 128, as shown in FIG. 13, and a position wherein the upper end of such latch arm will clear the confines of constricted passage 128, as shown in FIG. 15.

The operation of lock L-3 is generally similar to that of lock L, with lock arm 136 automatically snapping outwardly into a locked position when shank 118 is urged downwardly through constricted passage 128. To remove lock L-3 from baffle plate 130, the key 116 is rotated to rotate latch pin 138 axially inwardly towards the longitudinal axis of body 110, whereby latch finger 141 clears constricted passage 128.

Figure 16:
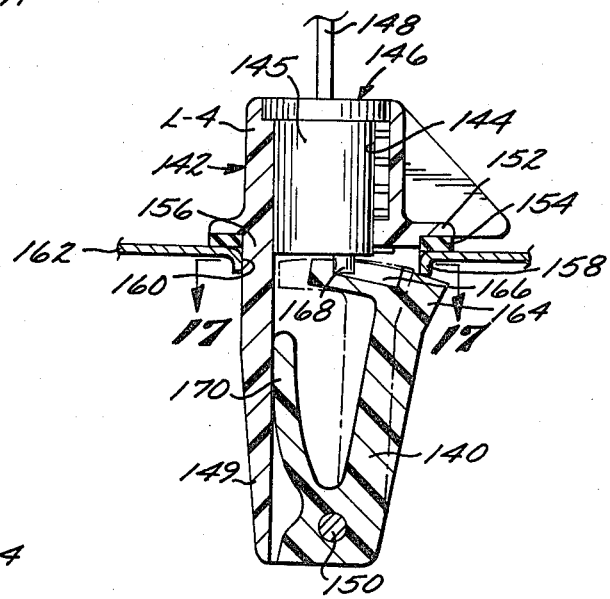
FIG. 16 is a vertical sectional view of a fourth form of fuel tank lock embodying the present invention.
Figure 17:
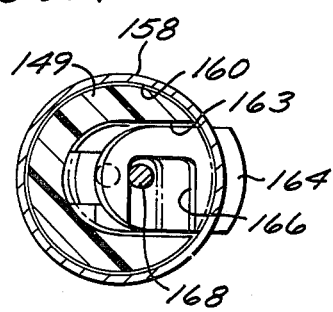
FIG. 17 is a horizontal sectional view taken along line 17—17 of FIG. 16.

Referring now to FIGS. 16 and 17, there is shown a fourth form of fuel tank lock L-4 embodying the present invention. Fuel tank lock L-4 is generally similar to fuel tank lock L-3, with the exception that a pivoted latch arm 140 is utilized instead of the integral latch 136 of lock L-3. Fuel tank lock L-4 includes an integral one-piece body generally designated 142, the upper portion of which is formed with a cylindrical cavity 144 that houses the cylinder 145 of a conventional locking mechanism 146 controlled by a key 148. The lower portion of body 142 defines a downwardly tapered shank 149 which pivotally carries the aforementioned latch arm 140 by means of a horizontal pin 150. Body 142 includes a collar 152, the underside of which abuts a resilient washer 154. Washer 154 encompasses a cylindrical boss 156 that is inserted within the downwardly curved lip 158 of a circular constricted passage 160 formed in baffle plate 162. Latch arm 140 extends through a vertical slot 163 formed in boss 156 and shank 149. Collar 152 may be provided with a transverse extension (not shown) similar to collar extension 67 of lock L, to engage one side of the filler neck (not shown) and thereby prevent rotation of body 142 relative to baffle plate 162.

The upper end of latch arm 140 is provided with a latch finger 164, formed with a pocket 166 that receives a single latch pin 168 secured to cylinder 145 of locking mechanism 146 that operates in exactly the same manner as latch pin 138 of locking mechanism 114 of lock L-3. It should be noted that the lower end of latch arm 140 is provided with an upwardly extending integral spring leaf 170 that abuts the interior of shank 149 so as to constantly resiliently urge latch arm 140 sidewardly and outwardly relative to the longitudinal axis of body 142, i.e. to the solid outline position shown in FIG. 16. Turning of key 148 causes lock cylinder 145 and hence pin 168 to rotate to the other side of the longitudinal axis of body 142 and thereby urge the latch arm 140 to its dotted outline position of FIGS. 16 and 17.

In the operation of fuel tank lock L-4, the shank 149 of such fuel lock is urged downwardly through constricted passage 160 until latch arm 140 springs outwardly and its latch finger 164 extends beyond the confines of constricted passage 160 to engage the underside of lip 158. The body 142 and its associated parts will then be securely locked with respect to baffle plate 162. In order to remove lock L-4 from its locked position, key 148 is turned so as to rotate lock cylinder 145 and hence latch pin 168 from the latter's solid outline position in FIGS. 16 and 17, to its dotted outline position therein. In such unlocked position, latch finger 164 will clear the constricted passage 160 whereby lock L-4 may be withdrawn upwardly therefrom.

Figure 20:
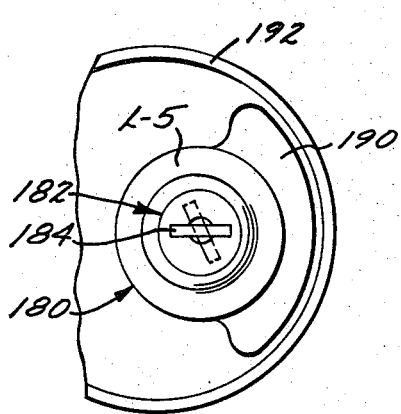
FIG. 20 is a top plan view of the lock of FIG. 18 taken along lines 20—20 of FIG. 18.
Figure 18:
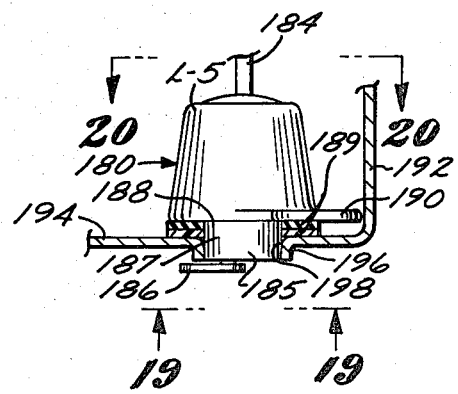
FIG. 18 is a side elevational view taken partly in section of a fifth form of fuel tank lock embodying the present invention.
Figure 19:
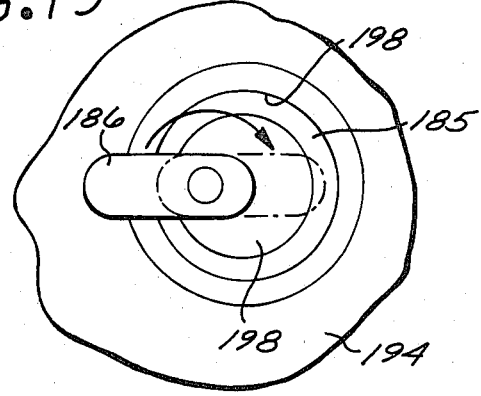
FIG. 19 is a view of the underside of the lock of FIG. 18, taken from lines 19—19 of FIG. 18.

Referring now to FIGS. 18, 19 and 20, there is shown a fifth form of fuel tank lock L-5 embodying the present invention. Fuel tank lock L-5 includes a generally frusto-conical body generally designated 180, provided in its upper portion with a conventional locking mechanism 182 operated by a key 184. Locking mechanism 182 includes a lock cylinder 185 that receives key 184. The lower end of cylinder 185 rotatably supports an axially extending latch finger 186. The intermediate portion of cylinder 185 is formed with a cylindrical boss which carries resilient washers 189. Body 180 is provided with a transverse extension 190 that abuts one side of baffle plate cup 192 of filler neck N to restrain rotation of the body relative thereto. The baffle plate 194 is formed with a downwardly curved lip 196 that defines a constricted passage 198. Lock cylinder 185 is telescopically insertable within lip 196. Latch finger 186 is rotatably moveable from its locking position shown in solid outline in FIG. 19 to its unlocked dotted line position therein by rotation of key 184.

In the operation of fuel tank lock L-5, key 184 is utilized to rotate latch finger 186 to its dotted outline position of FIG. 19 wherein such latch finger underlies body 180 inwardly of constricted passage 198. Cylinder 185 then serves as a shank which is telescopically inserted within lip 196 so as to close constricted passage 198. Key 184 is then turned so as to rotate latch finger 186 to its position of FIG. 18 corresponding to its solid outline position of FIG. 19 wherein such latch finger extends outwardly of constricted passage 198 and abuts the underside of lip 196 to secure lock L-5 in place. During turning of key 184, transverse extension 190 will engage the side of filler neck N so as to restrain rotation of body 180. To remove lock L-5, key 184 is again turned so as to rotate latch finger 186 to its unlocked position disposed inwardly of constricted passage 198. The lock may then be readily removed from such passage.

Figure 21:
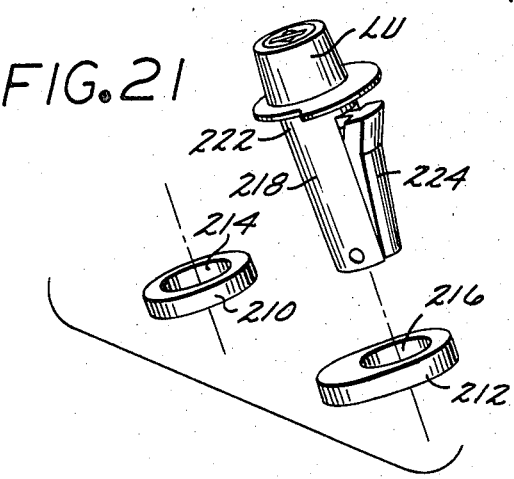
FIGS. 21, 22 and 23 are perspective views showing an adapter arrangement for use with a fuel tank lock of the present invention.
Figure 22:
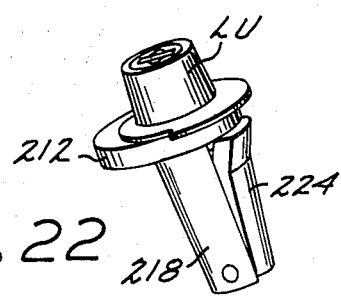
Figure 23:
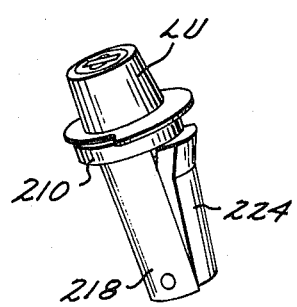

Referring now to FIGS. 21, 22 and 23, there is shown an adapter arrangement for use with each of the aforedescribed fuel tank locks embodying the present invention. The adapter arrangement of these figures permit a fuel tank lock embodying the present invention to be utilized alternatively with a cylindrical constricted passage or an oval-shaped constricted passage. The adapter arrangement includes a circular adapter 210 and an oval-shaped adapter 212, which may be formed of synthetic plastic. Each such adapter is provided with a circular opening 214 and 216, respectively, of similar diameter capable of being slidably received by the shank 218 of a universal type fuel tank lock LU. In this regard, the body of such fuel tank lock is provided below collar 220 with a cylindrical boss 222 having an outer diameter so dimensioned as to snugly telescopically receive the circular openings 214 and 216. It will be understood that lock LU includes a key operated locking mechanism for actuating latch pin means (not shown) which control the positioning of a latch arm 224. It should further be understood that the cylindrical adapter 210 is applied to lock LU when such lock is to be utilized in conjunction with a circular constricted passage (FIG. 23), while the oval-shaped adapter 212 will be applied to lock LU, where such lock is to be utilized with an oval-shaped constricted passage (FIG. 22). Preferably, the adapters 210 and 212 and lock shank 218 will be provided with a complementary tongue and groove arrangement (not shown) or the like to key the adapters to such shank.

Figure 24:
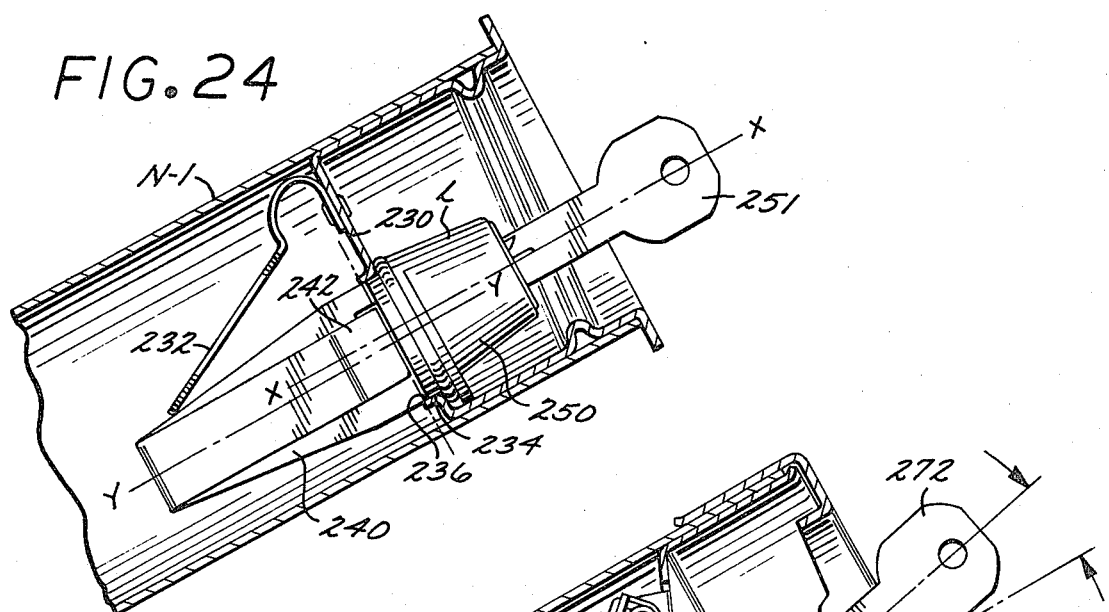
FIGS. 24, 25 and 26 are broken sectional views showing the perferred form of fuel tank lock modified for use in three different types of filler necks.
Figure 25:
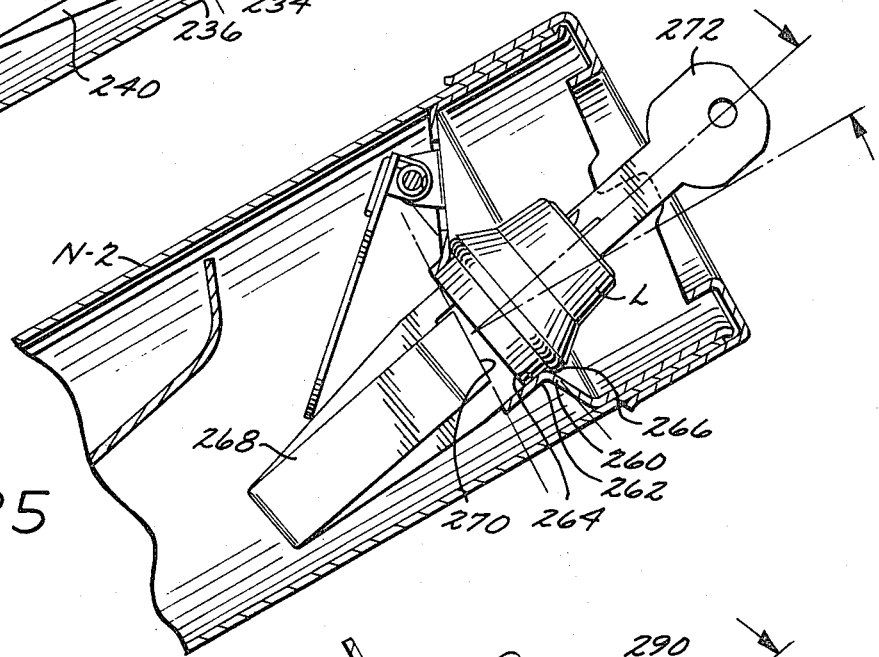
Figure 26:
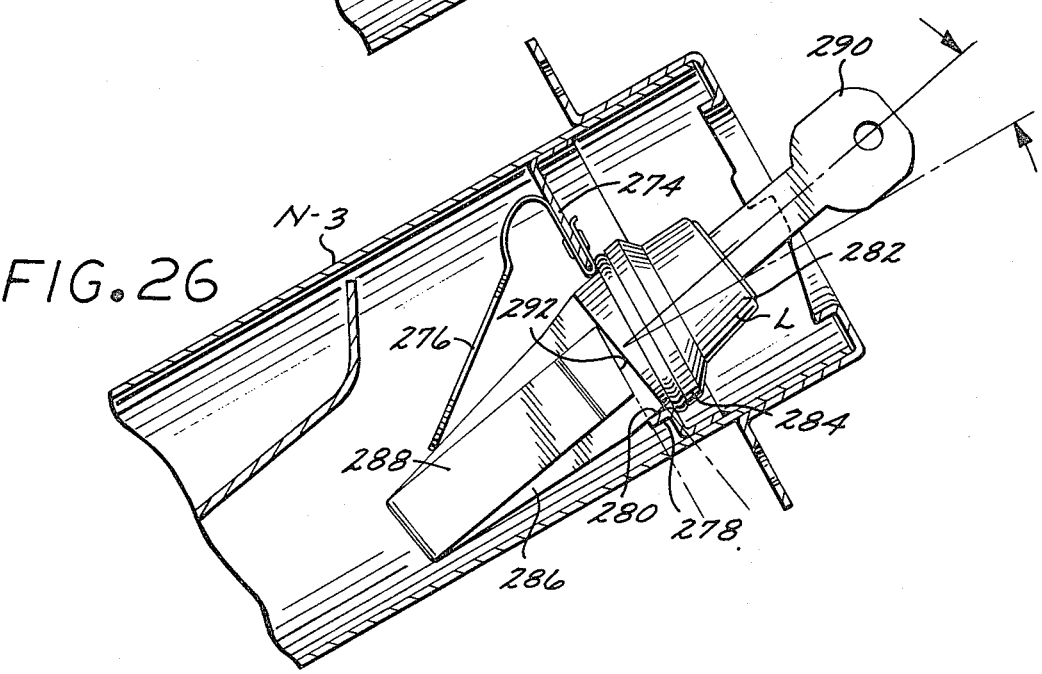

Referring now to FIGS. 24, 25 and 26, there are shown various arrangements for modifying the aforedescribed fuel tank locks for use with particular fuel tank filler neck configurations. Thus, referring first to FIG. 24, the filler neck N-1 shown therein is provided with a transverse baffle plate 230 normally closed by a spring loaded biased-shut valve 232. Baffle plate 230 is formed with a downwardly turned lip 234 which defines a constricted passage 236. It should be noted that the center-line of constricted passage 236 is displaced downwardly relative to the center-line of filler neck N-1. Accordingly, if the center-line of a lock L of the type shown in FIGS. 1–7 were utilized with such filler neck arrangement, the lower end of such lock could have insufficient clearance with respect to valve 232 thereby causing potential difficulty in installing and removing such lock.

To solve this problem the aforedescribed lock L is provided with a shank 240 and latch fingers 242 and 244 which are disposed downwardly relative to the longitudinal center-line of the lock body 250. The center-line of the lock is designated X—X while the center-line of the axially displaced shank 240 and latch fingers 242 are designated Y—Y in FIG. 21. In all other respects, lock L is identical in construction to the aforedescribed lock L. Such downward axial displacement of the shank and latch fingers insures that the latter will have ample clearance relative to valve 232 during the insertion and removal of lock L. Also, this arrangement more nearly centers the lock's key 251 relative to the top opening of filler neck N-1 to thereby facilitate installation and removal of the lock. Moreover, adequate clearance is provided for the inside edge of the cap 36.

Referring now to FIG. 25, there is shown a filler neck N-2 provided with a downwardly dished baffle plate 260 having a lip 262 which defines a constricted opening 264. A spring loaded biased-shut valve 265 is carried by the baffle plate 260 normally covers opening 264. It will be noted that the upwardly facing surface of the baffle plate 260 adjacent lip 262 is disposed at an angle relative to the longitudinal axis of filler neck N-2. Accordingly, in order to compensate for the variation in angles between the baffle plate seating surface 266 and the underside of lip 262, the upper end of latch fingers 268 of lock L are conformed to the angle of the underside of lip 262 as indicated particularly at 270 in FIG. 25. With this arrangement, a solid fit of lock L to the baffle plate 260 is obtained with the lock mounted at an angle displaced a predetermined number of degrees relative to the longitudinal axis of filler neck N-2. Also, the lock's key 272 is generally centered relative to the top opening of the filler neck N-2 so as to facilitate installation and removal of the lock.

Referring now to FiG. 26, there is shown a filler neck N-3 provided with a transverse baffle plate 274, normally closed by a spring-loaded biased-shut valve 276. Baffle plate 274 is formed with a downwardly turned lip 278, which defines a constricted passage 280. It will be noted that the center-line of constricted passage 280 is displaced downwardly relative to the center-line of filler neck N-1. Accordingly, as with the filler neck construction shown in FIG. 4, if a lock L of the type described hereinbefore were utilized with this arrangement, the lower end of the lock could have insufficient clearance with respect to valve 276 thereby causing potential difficulty in installing and removing such lock. To overcome such difficulty, the body 282 of this form of the lock is provided with a collar 284 which is arranged at an angle relative to the longitudinal centerline of the lock. This construction permits the lock L to be mounted at an angle displaced a predetermined number of degrees relative to the longitudinal axis of filler neck N-3. Accordingly, the shank 286 and latch fingers 288 will be displaced downwardly relative to the lower end of valve 276. Additionally, the key 290 of the lock will be generally centered relative to the top opening of the filler neck N-3 so as to facilitate installation and removal of the lock. With continued reference to FIG. 26, it will be noted that the upper end of latch fingers 288 are arranged generally normal to the longitudinal axis of filler neck N-3 so as to conform to the lower periphery of the lip 278, as indicated particularly at 292. The underside of collar 284 is arranged at substantially the same angle as that of the baffle plate 274. Accordingly, a solid fit of the lock L to the baffle plate 274 is thereby obtained.

Various modifications and changes may be made with respect to the foregoing detailed description without departing from the spirit of the present invention.

I claim:

1. A fuel tank lock for use with a conventional filler neck having a baffle plate formed with a round constricted passage that is eccentric to said filler neck and normally closed by a biased-shut valve member carried by said baffle plate that is forced open when engaged by an unleaded fuel nozzle of smaller transverse cross-section than said constricted passage, with the upper end of said filler neck being provided with a conventional fuel tank cap, said lock comprising:

a body provided with a key-operated locking mechanism in its upper portion and a shank that extends through said constricted passage;

collar means on said body larger than said constricted passage that rest upon the upper surface of said baffle plate to support said body thereupon;

latch means operatively associated with said body shank movable between a locked position wherein part of said latch means extend transversely of the underside of said baffle plate outwardly of said constricted passage and an unlocked position disposed inwardly of said passage to permit withdrawal of said shank from said passage, with said latch means being actuated by said locking mechanism; and a transverse extension formed on said collar means that abuts said filler neck above said constricted passage and transversely outwardly thereof to prevent rotation of said body shank within said passage relative to said baffle plate as said key-operated locking mechanism is actuated.

2. A fuel tank lock as set forth in claim 1, wherein resilient washer means are interposed between the underside of said collar and said baffle plate.

3. A fuel tank lock as set forth in claim 1, wherein said shank is rigid relative to said body and said latch means includes latch arm means movably secured to said shank for inward and outward movement relative to said constricted passage between a retracted and an extended position, with said latch arm means abutting the underside of said baffle plate in their extended position and clearing said passage in their retracted position.

4. A fuel tank lock as set forth in claim 3, wherein said latch arm means are constantly yieldingly biased outwardly towards their extended position.

5. A fuel tank lock as set forth in claim 4, wherein said body, shank and latch arm means are formed of a resilient synthetic plastic material.

6. A fuel tank lock as set forth in claim 5, wherein said body and shank are of integral construction and said latch arm means include a pair of upwardly extending latch arms integral with a center web that is affixed to the lower portion of said shank, said latch arms each formed at its upper end with latch finger means having latch pocket means, and said locking mechanism includes latch pin means that extend into said latch pocket means to move said latch arm means into said retracted position.

7. A fuel tank lock as set forth in claim 5, wherein said body and shank are of integral construction and said latch arm means include a pair of upwardly extending latch arms pivotally affixed at their lower ends to the lower portion of said shank, said latch arms each formed at its upper end with latch finger means having latch pocket means, and said locking mechanism includes latch pin means that extend into said latch pocket means to move said latch arm means into said retracted position.

8. A fuel tank lock as set forth in claim 5, wherein said body, shank and latch arm means are of integral construction, and said latch arm means includes a single upwardly extending latch arm formed at its upper end with latch finger means having latch pocket means and said locking mechanism includes latch pin means that extend into said latch pocket means to move said latch arm means into said retracted position.

9. A fuel tank lock as set forth in claim 5, wherein said body and shank are of integral construction and said latch arm means includes an upwardly extending latch arm pivotally secured to the lower portion of said shank and an upwardly extending spring leaf on the lower portion of said latch arm that abuts said shank to resiliently bias said latch arm towards its extended position, the upper portion of said latch arm being formed with latch finger means having latch pocket means and said locking mechanism includes latch pin means that extend into said latch pocket means to move said latch arm means into said retracted position.

* * * * *

UNITED STATES PATENT AND TRADEMARK OFFICE
CERTIFICATE OF CORRECTION

PATENT NO. : 4,362,036
DATED : December 7, 1982
INVENTOR(S) : Donald J. Shanklin It is certified that error appears in the above-identified patent and that said Letters Patent is hereby corrected as shown below:

Column 1, line 60, after "transverse" insert --extension on the body abuts the filler neck above the--

Signed and Sealed this

Fifth Day of April 1983

[SEAL]

Attest:

GERALD J. MOSSINGHOFF

*Attesting Officer*   *Commissioner of Patents and Trademarks*